(12) United States Patent
Fan et al.

(10) Patent No.: US 10,961,641 B2
(45) Date of Patent: Mar. 30, 2021

(54) FEATHER-LIKE POLYESTER FIBER AND PREPARING METHOD THEREOF

(71) Applicant: JIANGSU HENGLI CHEMICAL FIBRE CO., LTD., Wujiang (CN)

(72) Inventors: Hongwei Fan, Wujiang (CN); Lili Wang, Wujiang (CN); Jiangen Shen, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/042,957

(22) PCT Filed: Oct. 28, 2019

(86) PCT No.: PCT/CN2019/113580
§ 371 (c)(1),
(2) Date: Sep. 29, 2020

(87) PCT Pub. No.: WO2020/134486
PCT Pub. Date: Jul. 2, 2020

(65) Prior Publication Data
US 2021/0054535 A1  Feb. 25, 2021

(30) Foreign Application Priority Data
Dec. 27, 2018  (CN) .......................... 201811613945.5

(51) Int. Cl.
| | | |
|---|---|---|
| *D01F 6/92* | (2006.01) | |
| *D01D 5/253* | (2006.01) | |
| *D01F 1/10* | (2006.01) | |
| *D01D 5/088* | (2006.01) | |
| *C08G 63/695* | (2006.01) | |
| *C08G 63/46* | (2006.01) | |
| *C08G 63/86* | (2006.01) | |
| *C08G 63/183* | (2006.01) | |
| *C08K 5/524* | (2006.01) | |
| *C08K 5/521* | (2006.01) | |

(52) U.S. Cl.
CPC ............ *D01F 6/92* (2013.01); *C08G 63/183* (2013.01); *C08G 63/46* (2013.01); *C08G 63/6954* (2013.01); *C08G 63/866* (2013.01); *D01D 5/088* (2013.01); *D01D 5/253* (2013.01); *D01F 1/10* (2013.01); *C08K 5/521* (2013.01); *C08K 5/524* (2013.01)

(58) Field of Classification Search
CPC .......... D01D 5/08; D01D 5/084; D01D 5/088; D01D 5/096; D01D 5/098; D01D 5/0985; D01D 5/10; D01D 5/253; D01D 5/38; C08K 5/49; C08K 5/50; C08K 5/51; C08K 5/52; C08K 5/5205; C08K 5/521; C08K 5/524; C08K 5/526; C08K 5/527; C08K 5/529; C08K 5/53; C08K 5/5313; C08K 5/5317; C08K 5/5333; C08K 5/5337; C08K 5/5353; C08K 5/5357; C08K 5/5373; C08K 5/5377; C08K 5/5393; C08K 5/5397; C08K 5/5398; C08K 5/5399; C08G 63/20; C08G 63/46; C08G 63/68; C08G 63/681; C08G 63/682; C08G 63/6822; C08G 63/6824; C08G 63/6826; C08G 63/6828; C08G 63/695; C08G 63/6952; C08G 63/6954; C08G 63/6958; D01F 6/58; D01F 6/62; D01F 6/78; D01F 6/88; D01F 6/92
See application file for complete search history.

(56) References Cited

U.S. PATENT DOCUMENTS

2011/0301305 A1* 12/2011 Isono ................. C08G 63/6826
                                                                    525/434

FOREIGN PATENT DOCUMENTS

| CN | 101139435 A | 3/2008 |
|---|---|---|
| CN | 204661875 U | 9/2015 |
| CN | 109722727 A * | 5/2019 |
| CN | 109735941 A * | 5/2019 |
| CN | 109750369 A | 5/2019 |
| CN | 109750379 A * | 5/2019 |
| KR | 20160081624 A | 7/2016 |

OTHER PUBLICATIONS

CN 109722727 English Machine Translation prepared Jan. 11, 2021. (Year: 2021).*
CN 109735941 English Machine Translation prepared Jan. 11, 2021. (Year: 2021).*
CN 109750379 English Machine Translation prepared Jan. 11, 2021. (Year: 2021).*
Zhiqian Yang, Study on the PET Fiber Modified by Silicon Compound, China Master's Theses Full-Text Database, Engineering Science & Technology I, 2014, pp. 1-101, No. 01, ISSN: 1674-0246.

* cited by examiner

*Primary Examiner* — Christopher M Rodd
(74) *Attorney, Agent, or Firm* — Bayramoglu Law Offices LLC (57) ABSTRACT

A type of feather-like polyester fiber and a preparing method thereof are disclosed. The preparing method is to manufacture filament from a modified polyester through a POY process with a four-fold flat spinneret and a successive DTY processes, wherein said modified polyester is the product of the esterification and the successive polycondensation reactions of evenly mixed terephthalic acid, ethylene glycol, main-chain silicated diol and fluorinated dicarboxylic acid, and the spinneret is the one set with four-fold flat shaped orifices. The obtained fiber has a dye uptake of 89.6-93.7% when dyed at 130° C., and has an intrinsic viscosity drop of 13-20% when stored at 25° C. and R.H. 65% for 60 months. This invention is simple to apply and features a product with good dyeing and degradation performance.

16 Claims, 1 Drawing Sheet

FEATHER-LIKE POLYESTER FIBER AND PREPARING METHOD THEREOF

CROSS REFERENCE TO THE RELATED APPLICATIONS

This application is the national phase entry of International Application No. PCT/CN2019/113580, filed on Oct. 28, 2019, which is based upon and claims priority to Chinese Patent Application No. 201811613945.5, filed on Dec. 27, 2018, the entire contents of which are incorporated herein by reference.

TECHNICAL FIELD

The present invention belongs to the field of modified polyester fiber, and more particularly, relates to one type of feather-like polyester fiber and preparing method thereof.

BACKGROUND

Polyethylene terephthalate (PET) fiber, with the characteristics of high strength, good elasticity, good heat resistance, good chemical resistance and good dimensional stability, has become the most important textile material since its coming out as an important supplement to natural fibers. With the continuous improvement of living standards in modern society, the requirement for the quantity and quality of the fiber material in the field of clothing, decoration and industrial polyester has become higher and higher. To this end, it is necessary to develop the differential fibers with novel performance and added value.

Being smooth and uniform cylinders from the longitudinal view, common polyester fibers are of poor coherent due to their smooth surface. Therefore, the ends of polyester fiber are easy to expose outside the fabrics to form villi or further to cause pilling. At the same time, polyester fiber is also easy to generate static electricity under the friction because of its poor hygroscopicity and conductivity. In view of the above problems in ordinary circular cross-section fiber, the industry has carried out relevant research on the profiled polyester fibers. The study found that the polyester fiber with flat shaped cross-section (feather-like fiber) will possess improved luster, fluffiness, moisture absorption, elasticity and handle, as well as the pilling resistance. Although being used in plush toys, blankets, knitted fabrics and woven fabrics as a kind of high-grad raw material, the flat polyester fiber has the disadvantages of easy to break, low profiled degree and dyeing fault.

PET fiber belongs to a hydrophobic material lack of hydrophilic group, and is a rather dyeing inert one shorting of the dye attractive groups existed in cellulose fiber or protein fiber. In fact, PET fiber possesses a type of partly crystallized supramolecular structure, specifically, a coexistence state of crystalline regions composed of parallel molecular chains mostly in trans-conformation and amorphous regions composed of molecular chains mostly in cis-conformation, and such tight molecular arrangement cause the dyeing difficulties therefore. At present, the conventional PET fibers such as the common polyester DTY is usually dyed with disperse dyes at high temperature and high pressure, which can hardly get to the root of dyeing difficulties but bring high equipment requirement, long dyeing time and high energy consumption.

Furthermore, with the rapid development of PET industry, although PET will not directly cause harm to the environment, the difficulties in the PET waste treatment can indirectly increase environmental pressure due to its huge amount and strong resistance to atmospheric and microbial degradation. In present, landfill, incineration and recovery are the main methods to treat PET waste, from the environmental protection point of view, landfill and incineration are easy but dirty. Conversely, chemical degradation, i.e., to recover alcohol, carboxylic acid and ester from the alcoholysis reaction or aminolysis of polyester, has been believed as an efficient and scientific treatment for PET waste. However, the tight structure, the high crystallinity and the long natural degradation time (a period up to 16-48 years) of PET bring much restriction to the realization of chemical degradation recovery.

Therefore, it is of great significance to develop a kind of feather-like polyester fiber with the characteristics of easy to dye, low dyeing equipment requirement, low dyeing cost and high recovery efficiency.

SUMMARY

The primary object of the present invention is to provide one kind of feather-like polyester fiber with the characteristics of easy to dye, low dyeing equipment requirement, low dyeing cost and high recovery efficiency and preparing method thereof, so as to overcome the relevant inadequacies in the existed technology.

To this end, the key technical points of the invention are as follows:

The preparing method of the feather-like polyester fiber herein, is characterized by manufacturing filament from a modified polyester through the partially orientated yarn (POY) process with the four-fold flat spinneret and successive drawn textured yarn (DTY) processes;

wherein said four-fold flat spinneret denotes a spinning head set with a series of profiled orifices, each orifice is of a combination of four equally spaced parallel slits (named as i slit hereafter) and one vertical slit (named as j slit hereafter) bisecting those four;

wherein said modified polyester is the product of the esterification and the successive polycondensation of evenly mixed terephthalic acid, ethylene glycol, main-chain silicated diol and fluorinated dicarboxylic acid; and the main-chain silicated diol could be one of dimethylsiloxane diol, dimethyldiphenyldisiloxane glycol or tetramethyldisiloxane diol whereas the fluorinated dicarboxylic acid could be one of 2,2-difluoro-1,3-malonic acid, 2,2-difluoro-1,4-succinic acid, 2,2-difluoro-1,5-glutaric acid or 2,2,3,3-tetrafluoro-1,4-succinic acid.

In the present invention, —Si—O—Si— bonds will formed in main chain of polyester after importing silicated diol. The bond length between silicon atom and oxygen atom is relatively long and the internal rotation activation energy is rather low, which is favorable to the free rotation of atoms. Meanwhile, the silicon atoms in the main chain are bonded with —$CH_3$ which is perpendicular to the plane where —Si—O—Si— lies in, and the steric repulsion between those methyl groups will further enlarge the length of Si—O bond, in addition, the macromolecular chains themselves are also spaced by those inert methyl groups. Therefore, such silicated diol contained polyester has a fairly flexible molecular chain structure and an obviously enlarged free volume compared with unmodified one. Disperse dyes are some small molecules without water-soluble groups, and mostly exist in the form of particles with a size ranged from several hundred nanometers to one micron. During the dyeing process of herein said modified polyester, the segments containing —Si—O—Si— bond will move prior to those just containing carbon oxygen bond with the increasing temperature because the silicon oxygen bond has a longer bond length and a lower internal rotation activation energy. When the temperature of dyeing bath reaches 120-130° C., the silicon oxygen bonded molecular chains can form larger free volume owing to their active molecular movement beyond those carbon oxygen bonded ones. Therefore, the penetration of small molecules such as water, air or dye into the polyester will be enhanced significantly, which can reduce the dyeing temperature, shorten the dyeing time, reduce the energy consumption, improve the dye uptake, as well as accelerate somewhat the natural degradation of the fiber.

Meanwhile, in the present invention the fluorinated segments are incorporated into polyester by using the fluorinated dicarboxylic acid as a comonomer for the polyester. The special feature of the fluorinated dicarboxylic acid introduced herein is that the fluorine atom is bonded to α-C. During the hydrolysis process of polyester, the electron cloud density in the C—O bond is reduced by the electron-withdrawing effect of fluorine atom hence the stability of the tetrahedral anion intermediate formed by ester carbonyl together with nucleophilic attacker will also decrease, which is conducive to the nucleophilic addition reaction. Moreover, the steric hindrance of fluorinated dicarboxylic acid is less than that of terephthalic acid, which will promote the nucleophilic addition reaction further and significantly increase the degradation rate. In fact, the free volume increase generated by silicated diol, together with the fluorinated dicarboxylic acid here, will show a synergetic effect on the degradation of the polyester. Furthermore, the cross section of the polyester fiber herein is four-fold flat shaped, which will promise the fiber good luster, fluffiness, moisture absorption, elasticity and handle without losing spinnability.

The following preferred technology program is presented to give a detailed description for this invention.

In the preparing method of the feather-like polyester fiber hereinabove, wherein said i slit is a long narrow straight opening with rounded ends and a width of W2 as well as a length of L2;

wherein said j slit is long narrow rectangle opening with a width of W1 and a length of L1;

wherein said four-fold flat orifice is combined by an equally spaced array of a width L1 formed by four end-aligned i slits in parallel, together with a j slit which exactly bisects the array in perpendicular, i.e., the slits are combined with respect two orthogonal symmetry axes, one lies in the middle of four i slits and the other lies in the center line of j slit;

wherein said four-fold flat orifice has a dimension of L1/W1 as 10-15 and L2/W2 as 3-5, which should be properly defined in a certain range, otherwise, the upper overflow will bring the fiber poor processibility such as lousiness, broken, bad profile and dyeing fault whereas the lower overflow will be failed to ensure enough profiled degree for good luster, fluffiness, moisture absorption, elasticity, handle and pilling resistance.

wherein said modified polyester is prepared by means of:

(1) Esterification concocting terephthalic acid, ethylene glycol, main-chain silicated diol and fluorinated dicarboxylic acid into a slurry, then adding in the catalyst, the matting agent and the stabilizer and carrying out the esterification in a nitrogen atmosphere with a pressure of normal value −0.30 MPa at 250-260° C., finally ending the reaction when the water distillation reaching more than 90% of the theoretical value;

(2) Polycondensation successively, smoothly reducing the pressure to less than 500 Pa within 30-50 min and carrying out reaction at 250-260° C. for 30-50 min, successively, then further reducing the pressure to less than 100 Pa and continuing the reaction at 270-275° C. for 50-90 min.

In the preparing method of the feather-like polyester fiber hereinabove, the molar ratio of terephthalic acid and ethylene glycol is 1:1.2-2.0, and being relative to the amount of terephthalic acid, the total addition of the main-chain silicated diol and the fluorinated dicarboxylic acid is 3.2-5.0 mol % in a molar ratio of 2-3:1.5-2, while the additions of the catalyst, the matting agent and the stabilizer are 0.03-0.05 wt %, 0.20-0.25 wt % and 0.01-0.05 wt %, respectively. The addition of the main-chain silicated diol is optimized to significantly improve the dyeing and degradation performance of PET fiber without losing mechanical strength and crystallinity. Admittedly, the addition amount of the main-chain silicated diol could be adjusted according to the actual application, however the adjustment should not be too large. If the addition amount is too large, the regularity of polyester molecular chain will be heavily destroyed so as to bring too much strength and crystallinity loses, whereas if the addition amount is too small, the dyeing performance or natural degradation performance of the fiber cannot be improved efficiently.

In the preparing method of the feather-like polyester fiber hereinabove, wherein said catalyst is one of antimony trioxide, ethylene glycol antimony or antimony acetate, wherein said matting agent is titanium dioxide, and wherein said stabilizer is one of triphenyl phosphate, trimethyl phosphate or trimethyl phosphite;

wherein said modified polyester has a molecular weight of 25000-30000 and a molecular weight distribution index of 1.8-2.2;

wherein said POY process includes steps of metering, spinneret extruding, cooling, oiling and winding;

wherein said POY process involves the technological parameters of the spinning temperature as 280-290° C., the cooling temperature as 17-20° C., the winding speed as 3700-4100 m/min;

wherein said DTY process includes steps of filament guiding, hot stretching, false-twisting, heat setting and winding;

wherein said DTY process involves the technological parameters of the line speed as 450-800 m/min, the setting over-feed ratio as 3.5-5.5%, the winding over-feed ratio as 3.0-5.0%, the first heating chamber temperature as 150-200° C., the second heating chamber temperature as 120-170° C. and the draw ratio as 1.6-1.9.

In the present invention the feather-like polyester fiber obtained through the preparing method hereinabove is also provided, which is a type of modified polyester DTY with a four-fold flat shaped cross section;

wherein said modified polyester has a molecular chain structure composed of terephthalic acid segments, ethylene glycol segments, main-chain silicated diol segments and fluorinated dicarboxylic acid segments.

Prepared through the preferred technology program mentioned above, herein obtained feather-like polyester fiber has the following performance indices: monofilament fineness 1.0-1.5 dtex, crimp shrinkage ratio 4.0±1.0%, linear density deviation rate ≤1.2%, breaking strength 3.0±0.35 cN/dtex, breaking strength CV value ≤4.0%, elongation at break 22.0±3.0%, elongation at break CV value ≤8.0%, crimp shrinkage ratio CV value ≤9.0%, boiling water shrinkage ratio 7.0±0.5%, oil content 2-3 wt %, interlacing degree 60±10/m, and crimp ratio 40±4.0% (which are close to those of the unmodified common polyester fiber, because the addition amounts of the main-chain silicated diol and the fluorinated dicarboxylic acid herein are so small as not to obviously affect the processiblity and mechanical performance of the fiber);

herein obtained feather-like polyester fiber has the following dyeing performance indices: dye uptake 89.6-93.7% (dyed at 130° C.), K/S value 23.62-26.54, color fastness to soaping level 5, color fastness to dry crocking level 5, and color fastness to wet crocking more than level 4 (The corresponding indices measured under the same conditions for the contrast sample made of the unmodified common PET are listed as follows: dye uptake 82.3%, K/S value 20.11, color fastness to soaping less than level 5 (level 4-5 under polyester staining and level 4 under cotton staining), color fastness to dry crocking level 4-5 and color fastness to wet crocking level 3-4.);

herein obtained feather-like polyester fiber has an intrinsic viscosity drop of 13-20% after stored at 25° C. and R.H. 65% for 60 months (the corresponding drop of the contrast sample is just 5%, implying the incorporation of the fluorinated dicarboxylic acid favorable to ester bond broken and the main-chain silicated diol favorable to free volume increase will significantly accelerate the natural degradation rate of PET fiber).

The mechanism of this invention could be described as follows.

As a matter of fact, the accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

Herein the main-chain silicated diol is incorporated to improve the dyeing and natural degradation performance of the feather-like polyester fiber, which could be one of dimethylsiloxane glycol, dimethyldiphenyldisiloxane glycol or tetramethyldisiloxane glycol respectively possess a structural formula as follows:

dimethylsiloxane glycol dimethyldiphenyldisiloxane glycol

-continued tetramethyldisiloxane glycol

The rigidity of polymer chain depends on the internal rotation potential barrier between the molecular segments, and various chain structures, i.e., unequal bond angles, unequal bond lengths or different bonding modes, will result in diverse molecular rigidities. In the present invention, —Si—O—Si— bonds will formed in main chain of polyester after importing silicated diol. The bond length between silicon atom and oxygen atom is relatively long and the internal rotation activation energy is rather low, which is favorable to the free rotation of atoms. Meanwhile, the silicon atoms in the main chain are bonded with —CH$_3$ which is perpendicular to the plane where —Si—O—Si— lies in, and the steric repulsion between those methyl groups will further enlarge the length of Si—O bond, in addition, the macromolecular chains themselves are also spaced by those inert methyl groups. Therefore, such silicated diol contained polyester has a fairly flexible molecular chain structure and an obviously enlarged free volume compared with unmodified one. However, if a long side chain instead of methyl group is bonded to silicon atom, the limited increases of free volume and the entanglements between those long side chains just bring a less than desirable promotion on the penetration and diffusion of dye molecules. The increase of free volume is favorable for water or dye molecules to penetrate into the modified polyester, drawing a positive impact on the dyeing of polyester fiber such as obtaining higher dye uptake with lower dyeing temperature, shorter dyeing time and less energy consumption.

The rate of oxidative degradation and hydrolysis of polymer materials is closely related to the rate of oxygen penetration into the material. The macromolecular structure of polyester has high rigidity, low free volume fraction, and low oxygen permeability. Therefore, the oxidation and hydrolysis of polyester in natural environment are mainly carried out on the surface of polyester, which is one of the main reasons for the slow degradation of polyester in natural environment With the increase of the volume, oxygen can permeate into the macromolecules of polyester, and the oxidation degradation and hydrolysis rate of polyester can be improved.

On the other hand, the hydrolysis of polyester in alkaline medium is a nucleophilic addition-elimination process. During the ester hydrolysis, the nucleophilic addition reaction will occur firstly, in which OH⁻ attacks C atom in ester carbonyl RCOOR' to form a tetrahedral anion intermediate. From this tetrahedral anion, carboxylic acid RCOOH will be formed by eliminating OR' through the broken of ester bond, meanwhile alcohol R'OH can also be obtained from the combination of OR' with H⁺. However, normally the tetrahedral intermediate has a cramped structure with high steric hindrance, which is detrimental to the nucleophilic addition reaction, hence the ester hydrolysis usually carries on with a rather slow rate.

In the present invention, the polyester hydrolysis is significantly accelerated by importing special structural fluorinated dicarboxylic acid, concretely, dicarboxylic acid containing a α-C bonded with fluorine atoms. During the hydrolysis process of polyester, the electron cloud density in the C—O bond is reduced by the electron-withdrawing effect of fluorine atom boned to the α-C hence the stability of the tetrahedral anion intermediate will decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate. However, the degradation rate of polyester will not be improved significantly if the imported diol contains fluorine atom bonded to β-C because the electron-withdrawing effect generated by fluorine atom can only pass to adjacent carbon atom but hardly to C—O bond in ester group, hence the attacking of OH— upon carbonyl in nucleophilic addition reaction will not be affected so much. The incorporation of fluorinated dicarboxylic acid favorable to the nucleophilic addition, together with the main-chain fluorinated diol, will show a synergistic promoting effect on the natural degradation of polyester.

In conclusion, the present invention provides (1) a method for preparing the feather-like polyester fiber, wherein t the fluorinated dicarboxylic acid is incorporated to promote the natural degradation rate of the fiber;

(2) a method for preparing the feather-like polyester fiber, wherein the main-chain silicated diol is incorporated to gain a high dye uptake with shorter dyeing time, lower dyeing temperature as well as less energy consumption, and to improve the spinnability and natural degradation rate of the fiber;

(3) a method for preparing the feather-like polyester fiber with advantages of low cost, easy to operate and appreciable application value;

(4) a type of feather-like polyester fiber with good dyeing performance, rapid natural degradation and high mechanical properties for future application.

DETAILED DESCRIPTION OF THE EMBODIMENTS

Figure 1:
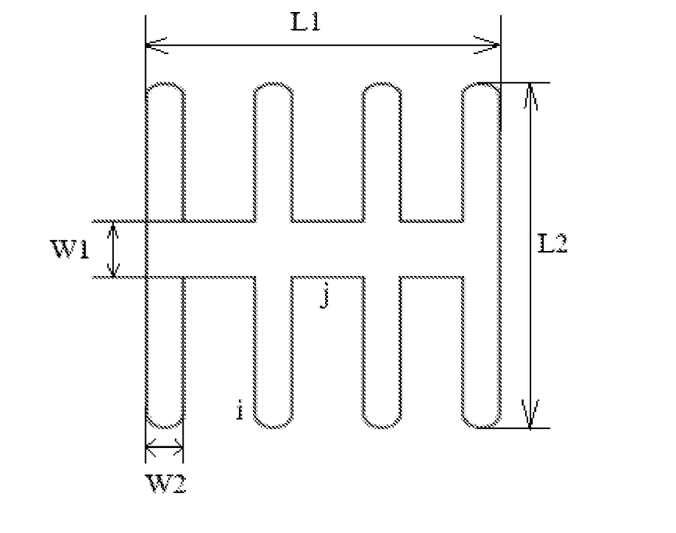
FIGURE is the diagram of the four-fold flat spinning orifice.

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the feather-like polyester fiber, comprising the steps:

(1) Preparation of Modified Polyester (1.1) Esterification concocting terephthalic acid, ethylene glycol, dimethylsiloxanediol and 2,2-difluoro-1,3-malonic acid into a slurry, then adding in antimony trioxide, titanium dioxide and triphenyl phosphate and carrying out the esterification in a nitrogen atmosphere with a pressure 0.3 MPa at 250° C., finally ending the reaction when the water distillation reaching 91% of the theoretical value, wherein the molar ratio of terephthalic acid and ethylene glycol being 1:1.2, and being relative to the amount of terephthalic acid, the total addition of dimethylsiloxanediol and 2,2-difluoro-1,3-malonic acid being 3.2 mol % in a molar ratio of 3:1.5, while the additions of antimony trioxide, titanium dioxide and triphenyl phosphate being 0.03 wt %, 0.20 wt % and 0.01 wt %, respectively;

(1.2) Polycondensation for the esterification products, smoothly reducing the pressure to 499 Pa (absolute value) within 30 min and carrying out reaction at 250° C. for 30 min, successively, further reducing the pressure to 99 Pa (absolute vale) and continuing the reaction at 270° C. for 50 min, and the finally obtained modified polyester possessing a molecular weight of 25000 and a molecular weight distribution index of 1.8;

(2) Spinning Modified Polyester POY through a technological way including stages of metering, spinneret extruding (at 285° C.), cooling (at 20° C.), oiling and winding (4000 m/min), converting the modified polyester into POY with a four-fold flat cross section; wherein used spinneret being set with orifices with the four-fold flat shape as demonstrated in the FIGURE, specifically, a combination of an equally spaced array of a width L1 formed by four end-aligned i slits (each is a long narrow straight opening with rounded ends and a width of W2 as well as a length of L2) in parallel, together with a j slit (a long narrow rectangle opening with a width of W1 and a length of L1) which exactly bisecting the i slit array in perpendicular, i.e., the slits being combined with respect two orthogonal symmetry axes, one lying in the middle of four i slits and the other lying in the center line of j slit, and L1/W1 being 12 whereas L2/W2 being 4;

(3) Preparing Modified Polyester DTY converting above POY into DTY through a technological way including stages of guiding, hot stretching (in the first heating chamber at 170° C. and with a draw ratio 1.8), false-twisting, heat setting (in the second heating chamber at 150° C. with an over-feed ratio 4.5%) and winding (at 600 m/min with an over-feed ratio 4%).

The feather-like polyester fiber, i.e., the DTY obtained hereinabove, possesses the mechanical performance indices of monofilament fineness 1.2 dtex, crimp shrinkage ratio 3.0%, linear density deviation rate 1.0%, breaking strength 3.35 cN/dtex, breaking strength CV value 3.6%, elongation at break 25%, elongation at break CV value 7.5%, crimp shrinkage ratio CV value 8.4%, boiling water shrinkage ratio 6.5%, oil content 3 wt %.

The dyeing performance indices of the feather like polyester obtained hereinabove are as following: dye uptake 89.6% (dyed at 130° C.), K/S value 23.62, color fastness to soaping level 5, color fastness to dry crocking level 5, and color fastness to wet crocking level 4-5.

The feather-like polyester fiber obtained hereinabove shows an intrinsic viscosity drop by 13% when stored at 25° C. and R.H. 65% for 60 months.

Comparison 1

A method for preparing the feather-like polyester fiber involved steps basically the same as those in Example 1, except for no modification for polyester, i.e., there is no dimethylsiloxanediol and 2,2-difluoro-1,3-malonic acid in step (1), from which the finally obtained feather-like polyester fiber possesses the mechanical performance indices of monofilament fineness 1.2 dtex, crimp shrinkage ratio 3.1%, linear density deviation rate 1.1%, breaking strength 3.35 cN/dtex, breaking strength CV value 3.6%, elongation at break 24%, elongation at break CV value 7.4%, crimp shrinkage ratio CV value 8.2%, boiling water shrinkage ratio 6.5%, oil content 2.8 wt %;

the dyeing performance indices of dye uptake 82.3% (dye at 130° C.), K/S value 20.11, color fastness to soaping less than level 5 (level 4-5 under polyester staining while level 4 under cotton staining), color fastness to dry crocking level 4-5, and color fastness to wet crocking level 3-4;

and an intrinsic viscosity drop by 4% when stored at 25° C. and R.H. 65% for 60 months.

The comparison shows that the modification herein by means of dimethylsiloxanediol and 2,2-difluoro-1,3-malonic acid will significantly improve the dyeing and natural degradation performance of polyester fiber without loss of processiblity and mechanical properties.

Comparison 2

A method for preparing the feather-like polyester fiber involved steps basically the same as those in Example 1, except for using 1,6-hexanediol instead of dimethylsiloxanediol in step (1), from which the finally obtained feather-like polyester fiber possesses the dyeing performance indices of dye uptake 85.9% (at 130° C.), K/S value 22.58, color fastness to soaping under polyester staining level 4-5 whereas under cotton staining level 4, color fastness to dry crocking less than level 4-5, and color fastness to wet crocking level 4. The comparison shows that the adding of main-chain silicated diol will incorporated into the polyester with —Si—O—Si— bonds favorable to reduce the internal rotation energy of segment movement so as to enlarge the free volume of polyester, showing a more efficient promotion on the dyeing performance than the diol just possessing long flexible alkylene backbone.

Comparison 3

A method for preparing the feather-line polyester filament involved steps basically the same as those in Example 1, except for using 3,3-difluoroglutaric acid instead of 2,2-difluoro-1,3-malonic acid in step (1), from which the finally obtained feather-like polyester fiber possesses an intrinsic viscosity drop by 4.7% when stored at 25° C. and R.H. 65% for 60 months. The comparison shows that compared with α-C bonded fluorine atom, β-C bonded fluorine atom in the modified polyester can only make rather weak effect upon the natural degradation of the obtained polyester fiber, because its electron-withdrawing effect just pass to the neighbor atoms of β-C so as to give little influence on the nucleophilic addition reaction of ester carbonyl when attacked by OH⁻.

Example 2

A method for preparing the feather-like polyester fiber, comprising the steps:

(1) Preparation of Modified Polyester (1.1) Esterification concocting terephthalic acid, ethylene glycol, dimethylsiloxanediol and 2,2-difluoro-1,4-succinic acid into a slurry, then adding in ethylene glycol antimony, titanium dioxide and trimethyl phosphate and carrying out the esterification in a nitrogen atmosphere with a normal pressure at 260° C., finally ending the reaction when the water distillation reaching 95% of the theoretical value, wherein the molar ratio of terephthalic acid and ethylene glycol being 1:2.0, and being relative to the amount of terephthalic acid, the total addition of dimethylsiloxanediol and 2,2-difluoro-1,4-succinic acid being 5 mol % in a molar ratio of 3:2, while the additions of ethylene glycol antimony, titanium dioxide and trimethyl phosphate being 0.05 wt %, 0.25 wt % and 0.05 wt %, respectively;

(1.2) Poly condensation for the esterification products, smoothly reducing the pressure to 450 Pa (absolute value) within 50 min and carrying out reaction at 260° C. for 50 min, successively, further reducing the pressure to 90 Pa (absolute vale) and continuing the reaction at 275° C. for 90 min, and the finally obtained modified polyester possessing a molecular weight of 30000 and a molecular weight distribution index of 2.2;

(2) Spinning Modified Polyester POY through a technological way including stages of metering, spinneret extruding (at 280° C.), cooling (at 17° C.), oiling and winding (3700 m/min), converting the modified polyester into POY with a four-fold flat cross section; wherein used spinneret being similar to that in Example 1 except for L1/W1 as 10 whereas L2/W2 as 3;

(3) Preparing Modified Polyester DTY converting above POY into DTY through a technological way including stages of guiding, hot stretching (in the first heating chamber at 170° C. and with a draw ratio 1.8), false-twisting, heat setting (in the second heating chamber at 150° C. with an over-feed ratio 4.5%) and winding (at 600 m/min with an over-feed ratio 4%).

The feather-like polyester fiber, i.e., the DTY obtained hereinabove, possesses the mechanical performance indices of monofilament fineness 1.0 dtex, crimp shrinkage ratio 5.0%, linear density deviation rate 1.2%, breaking strength 2.65 cN/dtex, breaking strength CV value 4.0%, elongation at break 19%, elongation at break CV value 7.8%, crimp shrinkage ratio CV value 8.8%, boiling water shrinkage ratio 7.4%, oil content 2 wt %.

The dyeing performance indices of the feather like polyester obtained hereinabove are as following: dye uptake 93.7% (dyed at 130° C.), K/S value 26.54 color fastness to soaping level 5, color fastness to dry crocking level 5, and color fastness to wet crocking level 5.

The feather-like polyester fiber obtained hereinabove shows an intrinsic viscosity drop by 14% when stored at 25° C. and R.H. 65% for 60 months.

Example 3

A method for preparing the feather-like polyester fiber, comprising the steps:

(1) Preparation of Modified Polyester (1.1) Esterification concocting terephthalic acid, ethylene glycol, dimethylsiloxanediol and 2,2-difluoro-1,5-glutaric acid into a slurry, then adding in antimony acetate, titanium dioxide and trimethyl phosphite and carrying out the esterification in a nitrogen atmosphere with a pressure of 0.2 MPa at 255° C., finally ending the reaction when the water distillation reaching 92% of the theoretical value, wherein the molar ratio of terephthalic acid and ethylene glycol being 1:1.6, and being relative to the amount of terephthalic acid, the total addition of dimethylsiloxanediol and 2,2-difluoro-1,5-glutaric acid being 3.4 mol % in a molar ratio of 2:1.5, while the additions of antimony acetate, titanium dioxide and trimethyl phosphite being 0.04 wt %, 0.22 wt % and 0.03 wt %, respectively;

(1.2) Polycondensation for the esterification products, smoothly reducing the pressure to 480 Pa (absolute value) within 40 min and carrying out reaction at 255° C. for 40 min, successively, further reducing the pressure to 95 Pa (absolute vale) and continuing the reaction at 272° C. for 70 min, and the finally obtained modified polyester possessing a molecular weight of 27000 and a molecular weight distribution index of 2.0;

(2) Spinning Modified Polyester POY through a technological way including stages of metering, spinneret extruding (at 290° C.), cooling (at 20° C.), oiling and winding (4100 m/min), converting the modified polyester into POY with a four-fold flat cross section; wherein used spinneret being similar to that in Example 1 except for L1/W1 as 15 whereas L2/W2 as 5;

(3) Preparing Modified Polyester DTY converting above POY into DTY through a technological way including stages of guiding, hot stretching (in the first heating chamber at 170° C. and with a draw ratio 1.8), false-twisting, heat setting (in the second heating chamber at 150° C. with an over-feed ratio 4.5%) and winding (at 600 m/min with an over-feed ratio 4%).

The feather-like polyester fiber, i.e., the DTY obtained hereinabove, possesses the mechanical performance indices of monofilament fineness 1.5 dtex, crimp shrinkage ratio 4.7%, linear density deviation rate 1.0%, breaking strength 3.30 cN/dtex, breaking strength CV value 3.6%, elongation at break 24%, elongation at break CV value 7.5%, crimp shrinkage ratio CV value 8.5%, boiling water shrinkage ratio 6.8%, oil content 2.7 wt %.

The dyeing performance indices of the feather like polyester obtained hereinabove are as following: dye uptake 90.3% (dyed at 130° C.), K/S value 24.62 color fastness to soaping level 5, color fastness to dry crocking level 5, and color fastness to wet crocking level 4-5.

The feather-like polyester fiber obtained hereinabove shows an intrinsic viscosity drop by 14% when stored at 25° C. and R.H. 65% for 60 months.

Example 4

A method for preparing the feather-like polyester fiber, comprising the steps:

(1) Preparation of Modified Polyester (1.1) Esterification concocting terephthalic acid, ethylene glycol, dimethyl diphenyldisiloxane glycol and 2,2,3,3-tetrafluoro-1,4-succinic acid into a slurry, then adding in ethylene glycol antimony, titanium dioxide and triphenyl phosphate and carrying out the esterification in a nitrogen atmosphere with a pressure of 0.25 MPa at 250° C., finally ending the reaction when the water distillation reaching 94% of the theoretical value, wherein the molar ratio of terephthalic acid and ethylene glycol being 1:1.9, and being relative to the amount of terephthalic acid, the total addition of dimethyl diphenyldisiloxane glycol and 2,2,3,3-tetrafluoro-1,4-succinic acid being 3.5 mol % in a molar ratio of 2:2, while the additions of ethylene glycol antimony, titanium dioxide and triphenyl phosphate being 0.03 wt %, 0.20 wt % and 0.05 wt %, respectively;

(1.2) Polycondensation for the esterification products, smoothly reducing the pressure to 480 Pa (absolute value) within 35 min and carrying out reaction at 258° C. for 45 min, successively, further reducing the pressure to 96 Pa (absolute vale) and continuing the reaction at 270° C. for 55 min, and the finally obtained modified polyester possessing a molecular weight of 26000 and a molecular weight distribution index of 1.9;

(2) Spinning Modified Polyester POY through a technological way including stages of metering, spinneret extruding (at 285° C.), cooling (at 18° C.), oiling and winding (3800 m/min), converting the modified polyester into POY with a four-fold flat cross section; wherein used spinneret being similar to that in Example 1 except for L1/W1 as 12 whereas L2/W2 as 3.5;

(3) Preparing Modified Polyester DTY converting above POY into DTY through a technological way including stages of guiding, hot stretching (in the first heating chamber at 150° C. and with a draw ratio 1.6), false-twisting, heat setting (in the second heating chamber at 120° C. with an over-feed ratio 3.5%) and winding (at 450 m/min with an over-feed ratio 3.0%).

The feather-like polyester fiber, i.e., the DTY obtained hereinabove, possesses the mechanical performance indices of monofilament fineness 1.2 dtex, crimp shrinkage ratio 4.7%, linear density deviation rate 1.0%, breaking strength 3.2 cN/dtex, breaking strength CV value 3.7%, elongation at break 24%, elongation at break CV value 7.8%, crimp shrinkage ratio CV value 8.6%, boiling water shrinkage ratio 7%, oil content 2.6 wt %.

The dyeing performance indices of the feather like polyester obtained hereinabove are as following: dye uptake 90.3% (dyed at 130° C.), K/S value 23.88 color fastness to soaping level 5, color fastness to dry crocking level 5, and color fastness to wet crocking level 4-5.

The feather-like polyester fiber obtained hereinabove shows an intrinsic viscosity drop by 15% when stored at 25° C. and R.H. 65% for 60 months.

Example 5

A method for preparing the feather-like polyester fiber, comprising the steps:

(1) Preparation of Modified Polyester (1.1) Esterification concocting terephthalic acid, ethylene glycol, dimethyl diphenyldisiloxane diol and 2,2-difluoro-1,3-malonic acid into a slurry, then adding in antimony acetate, titanium dioxide and triphenyl phosphate and carrying out the esterification in a nitrogen atmosphere with a pressure of 0.15 MPa at 260° C., finally ending the reaction when the water distillation reaching 96% of the theoretical value, wherein the molar ratio of terephthalic acid and ethylene glycol being 1:1.2, and being relative to the amount of terephthalic acid, the total addition of dimethyl diphenyldisiloxane diol and 2,2-difluoro-1,3-malonic acid being 4.2 mol % in a molar ratio of 2.5:1.5, while the additions of antimony acetate, titanium dioxide and triphenyl phosphate being 0.04 wt %, 0.25 wt % and 0.04 wt %, respectively;

(1.2) Polycondensation for the esterification products, smoothly reducing the pressure to 480 Pa (absolute value) within 50 min and carrying out reaction at 255° C. for 50 min, successively, further reducing the pressure to 95 Pa (absolute vale) and continuing the reaction at 275° C. for 80 min, and the finally obtained modified polyester possessing a molecular weight of 29000 and a molecular weight distribution index of 2.1;

(2) Spinning Modified Polyester POY through a technological way including stages of metering, spinneret extruding (at 285° C.), cooling (at 18° C.), oiling and winding (3800 m/min), converting the modified polyester into POY with a four-fold flat cross section; wherein used spinneret being similar to that in Example 1 except for L1/W1 as 12 whereas L2/W2 as 3.5;

(3) Preparing Modified Polyester DTY converting above POY into DTY through a technological way including stages of guiding, hot stretching (in the first heating chamber at 200° C. and with a draw ratio 1.9), false-twisting, heat setting (in the second heating chamber at 170° C. with an over-feed ratio 5.5%) and winding (at 800 m/min with an over-feed ratio 5.0%).

The feather-like polyester fiber, i.e., the DTY obtained hereinabove, possesses the mechanical performance indices of monofilament fineness 1.2 dtex, crimp shrinkage ratio 3.5%, linear density deviation rate 1.1%, breaking strength 2.9 cN/dtex, breaking strength CV value 3.8%, elongation at break 22%, elongation at break CV value 7.8%, crimp shrinkage ratio CV value 8.8%, boiling water shrinkage ratio 6.8%, oil content 2.5 wt %.

The dyeing performance indices of the feather like polyester obtained hereinabove are as following: dye uptake 91.2% (dyed at 130° C.), K/S value 24.72 color fastness to soaping level 5, color fastness to dry crocking level 5, and color fastness to wet crocking level 5.

The feather-like polyester fiber obtained hereinabove shows an intrinsic viscosity drop by 17% when stored at 25° C. and R.H. 65% for 60 months.

Example 6

A method for preparing the feather-like polyester fiber, comprising the steps:
(1) Preparation of Modified Polyester
(1.1) Esterification
concocting terephthalic acid, ethylene glycol, tetramethyldisiloxane glycol and 2,2-difluoro-1,4-succinic acid into a slurry, then adding in antimony acetate, titanium dioxide and triphenyl phosphate and carrying out the esterification in a nitrogen atmosphere with a pressure of 0.3 MPa at 250° C., finally ending the reaction when the water distillation reaching 94% of the theoretical value, wherein the molar ratio of terephthalic acid and ethylene glycol being 1:1.2, and being relative to the amount of terephthalic acid, the total addition of tetramethyldisiloxane glycol and 2,2-difluoro-1,4-succinic acid being 4.5 mol % in a molar ratio of 2.5:2, while the additions of antimony acetate, titanium dioxide and triphenyl phosphate being 0.05 wt %, 0.20 wt % and 0.01 wt %, respectively;
(1.2) Polycondensation
for the esterification products, smoothly reducing the pressure to 450 Pa (absolute value) within 30 min and carrying out reaction at 260° C. for 30 min, successively, further reducing the pressure to 92 Pa (absolute vale) and continuing the reaction at 272° C. for 85 min, and the finally obtained modified polyester possessing a molecular weight of 28000 and a molecular weight distribution index of 1.8;
(2) Spinning Modified Polyester POY
through a technological way including stages of metering, spinneret extruding (at 287° C.), cooling (at 20° C.), oiling and winding (3900 m/min), converting the modified polyester into POY with a four-fold flat cross section; wherein used spinneret being similar to that in Example 1 except for L1/W1 as 14 whereas L2/W2 as 5;
(3) Preparing Modified Polyester DTY
converting above POY into DTY through a technological way including stages of guiding, hot stretching (in the first heating chamber at 180° C. and with a draw ratio 1.8), false-twisting, heat setting (in the second heating chamber at 150° C. with an over-feed ratio 4%) and winding (at 500 m/min with an over-feed ratio 4.2%).

The feather-like polyester fiber, i.e., the DTY obtained hereinabove, possesses the mechanical performance indices of monofilament fineness 1.4 dtex, crimp shrinkage ratio 4.7%, linear density deviation rate 1.2%, breaking strength 2.8 cN/dtex, breaking strength CV value 4.0%, elongation at break 20%, elongation at break CV value 7.8%, crimp shrinkage ratio CV value 8.8%, boiling water shrinkage ratio 7.5%, oil content 2.7 wt %.

The dyeing performance indices of the feather like polyester obtained hereinabove are as following: dye uptake 92.7% (dyed at 130° C.), K/S value 24.8 color fastness to soaping level 5, color fastness to dry crocking level 5, and color fastness to wet crocking level 5.

The feather-like polyester fiber obtained hereinabove shows an intrinsic viscosity drop by 18% when stored at 25° C. and R.H. 65% for 60 months.

Example 7

A method for preparing the feather-like polyester fiber, comprising the steps:
(1) Preparation of Modified Polyester
(1.1) Esterification
concocting terephthalic acid, ethylene glycol, tetramethyldisiloxane glycol and 2,2-difluoro-1,5-glutaric acid into a slurry, then adding in antimony trioxide, titanium dioxide and trimethyl phosphite and carrying out the esterification in a nitrogen atmosphere with a pressure of 0.2 MPa at 255° C., finally ending the reaction when the water distillation reaching 91% of the theoretical value, wherein the molar ratio of terephthalic acid and ethylene glycol being 1:1.4, and being relative to the amount of terephthalic acid, the total addition of tetramethyldisiloxane glycol and 2,2-difluoro-1,5-glutaric acid being 4.8 mol % in a molar ratio of 3:2, while the additions of antimony trioxide, titanium dioxide and trimethyl phosphite being 0.03 wt %, 0.22 wt % and 0.01 wt %, respectively;
(1.2) Polycondensation
for the esterification products, smoothly reducing the pressure to 490 Pa (absolute value) within 50 min and carrying out reaction at 255° C. for 50 min, successively, further reducing the pressure to 95 Pa (absolute vale) and continuing the reaction at 275° C. for 55 min, and the finally obtained modified polyester possessing a molecular weight of 25000 and a molecular weight distribution index of 2.2;
(2) Spinning Modified Polyester POY
through a technological way including stages of metering, spinneret extruding (at 287° C.), cooling (at 20° C.), oiling and winding (3900 m/min), converting the modified polyester into POY with a four-fold flat cross section; wherein used spinneret being similar to that in Example 1 except for L1/W1 as 14 whereas L2/W2 as 5;
(3) Preparing Modified Polyester DTY
converting above POY into DTY through a technological way including stages of guiding, hot stretching (in the first heating chamber at 180° C. and with a draw ratio 1.8), false-twisting, heat setting (in the second heating chamber at 150° C. with an over-feed ratio 5%) and winding (at 500 m/min with an over-feed ratio 4.2%).

The feather-like polyester fiber, i.e., the DTY obtained hereinabove, possesses the mechanical performance indices of monofilament fineness 1.5 dtex, crimp shrinkage ratio 5.0%, linear density deviation rate 1.1%, breaking strength 2.7 cN/dtex, breaking strength CV value 3.9%, elongation at break 20%, elongation at break CV value 8.0%, crimp shrinkage ratio CV value 8.8%, boiling water shrinkage ratio 7.4%, oil content 2.2 wt %.

The dyeing performance indices of the feather like polyester obtained hereinabove are as following: dye uptake 93.2% (dyed at 130° C.), K/S value 25.54 color fastness to soaping level 5, color fastness to dry crocking level 5, and color fastness to wet crocking level 5.

The feather-like polyester fiber obtained hereinabove shows an intrinsic viscosity drop by 19% when stored at 25° C. and R.H. 65% for 60 months.

Example 8

A method for preparing the feather-like polyester fiber, comprising the steps:
(1) Preparation of Modified Polyester
(1.1) Esterification
concocting terephthalic acid, ethylene glycol, tetramethyldisiloxane glycol and 2,2,3,3-tetrafluoro-1,4-succinic acid into a slurry, then adding in ethylene glycol antimony, titanium dioxide and triphenyl phosphate and carrying out the esterification in a nitrogen atmosphere with a pressure of 0.3 MPa at 255° C., finally ending the reaction when the water distillation reaching 92% of the theoretical value, wherein the molar ratio of terephthalic acid and ethylene glycol being 1:1.2, and being relative to the amount of terephthalic acid, the total addition of tetramethyldisiloxane glycol and 2,2,3,3-tetrafluoro-1,4-succinic acid being 5 mol % in a molar ratio of 3:1.5, while the additions of ethylene glycol antimony, titanium dioxide and triphenyl phosphate being 0.05 wt %, 0.25 wt % and 0.01 wt %, respectively;
(1.2) Polycondensation
for the esterification products, smoothly reducing the pressure to 480 Pa (absolute value) within 50 min and carrying out reaction at 260° C. for 40 min, successively, further reducing the pressure to 95 Pa (absolute vale) and continuing the reaction at 272° C. for 90 min, and the finally obtained modified polyester possessing a molecular weight of 29000 and a molecular weight distribution index of 2.1;
(2) Spinning Modified Polyester POY
through a technological way including stages of metering, spinneret extruding (at 287° C.), cooling (at 20° C.), oiling and winding (3900 m/min), converting the modified polyester into POY with a four-fold flat cross section; wherein used spinneret being similar to that in Example 1 except for L1/W1 as 14 whereas L2/W2 as 5;
(3) Preparing Modified Polyester DTY
converting above POY into DTY through a technological way including stages of guiding, hot stretching (in the first heating chamber at 180° C. and with a draw ratio 1.8), false-twisting, heat setting (in the second heating chamber at 150° C. with an over-feed ratio 5%) and winding (at 500 m/min with an over-feed ratio 4.2%).

The feather-like polyester fiber, i.e., the DTY obtained hereinabove, possesses the mechanical performance indices of monofilament fineness 1.5 dtex, crimp shrinkage ratio 5.0%, linear density deviation rate 1.2%, breaking strength 2.65 cN/dtex, breaking strength CV value 4.0%, elongation at break 24%, elongation at break CV value 7.2%, crimp shrinkage ratio CV value 9.0%, boiling water shrinkage ratio 7.4%, oil content 2 wt %.

The dyeing performance indices of the feather like polyester obtained hereinabove are as following: dye uptake 93.4% (dyed at 130° C.), K/S value 26.34 color fastness to soaping level 5, color fastness to dry crocking level 5, and color fastness to wet crocking level 4-5.

The feather-like polyester fiber obtained hereinabove shows an intrinsic viscosity drop by 20% when stored at 25° C. and R.H. 65% for 60 months.

What is claimed is:
1. A preparing method for a feather-like polyester fiber, comprising: manufacturing a filament from a modified polyester through a partially orientated yarn (POY) process with a four-fold flat spinneret and successive drawn textured yarn (DTY) processes;
wherein the four-fold flat spinneret denotes a spinning head set with a series of profiled orifices, and each of the profiled orifices is a combination of four equally spaced parallel slits and one vertical slit bisecting the four equally spaced parallel slits, wherein each of the four equally spaced parallel slits is called an i slit, and the vertical slit is called a j slit;
wherein the modified polyester is a product of an esterification and successive polycondensation reactions of an evenly mixed mixture of terephthalic acid, ethylene glycol, a main-chain silicated diol and a fluorinated dicarboxylic acid; wherein the main-chain silicated diol is one selected from the group consisting of dimethylsiloxane diol, dimethyldiphenyldisiloxane glycol and tetramethyldisiloxane diol, and the fluorinated dicarboxylic acid is one selected from the group consisting of 2,2-difluoro-1,3-malonic acid, 2,2-difluoro-1,4-succinic acid, 2,2-difluoro-1,5-glutaric acid and 2,2,3,3-tetrafluoro-1,4-succinic acid.

2. The preparing method of claim 1, wherein the i slit is a long narrow straight opening with rounded ends and a width of W2 and a length of L2; wherein the j slit is a long narrow rectangle opening with a width of W1 and a length of L1; wherein each of the profiled orifices is formed by an equally spaced array of a width L1 formed by four end-aligned i slits in parallel, together with the j slit exactly bisecting the equally spaced array perpendicularly, wherein the the four i slits and the j slit are combined with two orthogonal symmetry axes respectively, one of the two orthogonal symmetry axes lies in a middle of the four i slits and the other of the two orthogonal symmetry axes lies in a center line of the j slit; wherein each of the profiled orifices has a dimension of L1/W1 as 10-15 and L2/W2 as 3-5.

3. The preparing method of claim 1, wherein the modified polyester is prepared by means of:
(1) Esterification
concocting the terephthalic acid, the ethylene glycol, the main-chain silicated diol and the fluorinated dicarboxylic acid into a slurry, then adding a catalyst, a matting agent and a stabilizer in the slurry and carrying out the esterification in a nitrogen atmosphere with a pressure of normal value −0.30 MPa at 250-260° C., finally ending the esterification when a water distillation reaches more than 90% of a theoretical value;
(2) Polycondensation
for products of the esterification, smoothly reducing the pressure to less than 500 Pa within 30-50 min and carrying out the successive polycondensation reactions at 250-260° C. for 30-50 min, then further reducing the pressure to less than 100 Pa and continuing the successive polycondensation reactions at 270-275° C. for 50-90 min.

4. The preparing method of claim 3, wherein a molar ratio of the terephthalic acid and the ethylene glycol is 1:(1.2-2.0), and a total addition of the main-chain silicated diol and the fluorinated dicarboxylic acid is 3.2-5.0 mol % of an amount of the terephthalic acid, wherein a molar ratio of the main-chain silicated diol and the fluorinated dicarboxylic acid is (2-3):(1.5-2), while an amount of the catalyst, an amount of the matting agent and an amount of the stabilizer are 0.03-0.05 wt %, 0.20-0.25 wt % and 0.01-0.05 wt % of the amount of the terephthalic acid, respectively.

5. The preparing method of claim 4, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

6. The preparing method of claim 5, wherein the modified polyester has a molecular weight of 25000-30000 and a molecular weight distribution index of 1.8-2.2.

7. The preparing method of claim 1, wherein the POY process includes steps of metering, spinneret extruding, cooling, oiling and winding;
wherein the POY process involves the following parameters: a spinning temperature of 280-290° C., a cooling temperature of 17-20° C. a winding speed of 3700-4100 m/min;
wherein the successive DTY processes include steps of filament guiding, hot stretching, false-twisting, heat setting and winding;
wherein the successive DTY processes involve the following parameters: a line speed of 450-800 m/min, a setting over-feed ratio of 3.5-5.5%, a winding over-feed ratio of 3.0-5.0%, a first heating chamber temperature of 150-200° C., a second heating chamber temperature of 120-170° C. and a draw ratio of 1.6-1.9.

8. A feather-like polyester fiber prepared by the preparing method of claim 1, comprising: a type of modified polyester DTY with a four-fold flat shaped cross section;
wherein the modified polyester has a molecular chain structure composed of terephthalic acid segments, ethylene glycol segments, main-chain silicated diol segments and fluorinated dicarboxylic acid segments.

9. The feather-like polyester fiber of claim 8, wherein the feather-like polyester fiber has mechanical performance indices of a monofilament fineness 1.0-1.5 dtex, a crimp shrinkage ratio 4.0±1.0%, a linear density deviation rate 1.2%, a breaking strength 3.0±0.35 cN/dtex, a breaking strength CV value 4.0%, an elongation at break 22.0±3.0%, an elongation at break CV value %, a crimp shrinkage ratio CV value 9.0%, a boiling water shrinkage ratio 7.0±0.5%, an oil content 2-3 wt %.

10. The feather-like polyester fiber of claim 8, wherein the feather-like polyester fiber has
dyeing performance indices of a dye uptake 89.6-93.7% (dyed at 130° C.), a K/S value 23.62-26.54, a color fastness to soaping level 5, a color fastness to dry crocking level 5, and a color fastness to wet crocking more than level 4;
and has an intrinsic viscosity drop of 13-20% after a storage at 25° C. and R.H. 65% for 60 months.

11. The feather-like polyester fiber of claim 8, wherein the i slit is a long narrow straight opening with rounded ends and a width of W2 and a length of L2; wherein the j slit is a long narrow rectangle opening with a width of W1 and a length of L1; wherein each of the profiled orifices is formed by an equally spaced array of a width L1 formed by four end-aligned i slits in parallel, together with the j slit exactly bisecting the equally spaced array perpendicularly, wherein the the four i slits and the j slit are combined with two orthogonal symmetry axes respectively, one of the two orthogonal symmetry axes lies in a middle of the four i slits and the other of the two orthogonal symmetry axes lies in a center line of the j slit; wherein each of the profiled orifices has a dimension of L1/W1 as 10-15 and L2/W2 as 3-5.

12. The feather-like polyester fiber of claim 8, wherein the modified polyester is prepared by means of:
(1) Esterification
concocting the terephthalic acid, the ethylene glycol, the main-chain silicated diol and the fluorinated dicarboxylic acid into a slurry, then adding a catalyst, a matting agent and a stabilizer in the slurry and carrying out the esterification in a nitrogen atmosphere with a pressure of normal value −0.30 MPa at 250-260° C., finally ending the esterification when a water distillation reaches more than 90% of a theoretical value;
(2) Polycondensation
for products of the esterification, smoothly reducing the pressure to less than 500 Pa within 30-50 min and carrying out the successive polycondensation reactions at 250-260° C. for 30-50 min, then further reducing the pressure to less than 100 Pa and continuing the successive polycondensation reactions at 270-275° C. for 50-90 min.

13. The feather-like polyester fiber of claim 12, wherein a molar ratio of the terephthalic acid and the ethylene glycol is 1:(1.2-2.0), and a total addition of the main-chain silicated diol and the fluorinated dicarboxylic acid is 3.2-5.0 mol % of an amount of the terephthalic acid, wherein a molar ratio of the main-chain silicated diol and the fluorinated dicarboxylic acid is (2-3):(1.5-2), while an amount of the catalyst, an amount of the matting agent and an amount of the stabilizer are 0.03-0.05 wt %, 0.20-0.25 wt % and 0.01-0.05 wt % of the amount of the terephthalic acid, respectively.

14. The feather-like polyester fiber of claim 13, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

15. The feather-like polyester fiber of claim 14, wherein the modified polyester has a molecular weight of 25000-30000 and a molecular weight distribution index of 1.8-2.2.

16. The feather-like polyester fiber of claim 8, wherein the POY process includes steps of metering, spinneret extruding, cooling, oiling and winding;
wherein the POY process involves the following parameters: a spinning temperature of 280-290° C., a cooling temperature of 17-20° C., a winding speed of 3700-4100 m/min;
wherein the successive DTY processes include steps of filament guiding, hot stretching, false-twisting, heat setting and winding;
wherein the successive DTY processes involve the following parameters: a line speed of 450-800 m/min, a setting over-feed ratio of 3.5-5.5%, a winding over-feed ratio of 3.0-5.0%, a first heating chamber temperature of 150-200° C., a second heating chamber temperature of 120-170° C. and a draw ratio of 1.6-1.9.

* * * * *